US008378515B2

(12) United States Patent
Fortmann

(10) Patent No.: US 8,378,515 B2
(45) Date of Patent: Feb. 19, 2013

(54) WIND TURBINES HAVING CONTROL FOR NETWORK FAULTS AND OPERATING METHOD THEREOF

(75) Inventor: Jens Fortmann, Berlin (DE)

(73) Assignee: REpower Systems AG, Hamburg (DE)

( * ) Notice: Subject to any disclaimer, the term of this patent is extended or adjusted under 35 U.S.C. 154(b) by 400 days.

(21) Appl. No.: 12/682,438

(22) PCT Filed: Oct. 9, 2008

(86) PCT No.: PCT/EP2008/008545
§ 371 (c)(1),
(2), (4) Date: Jul. 12, 2010

(87) PCT Pub. No.: WO2009/049822
PCT Pub. Date: Apr. 23, 2009

(65) Prior Publication Data
US 2010/0276930 A1  Nov. 4, 2010

(30) Foreign Application Priority Data

Oct. 12, 2007 (DE) .......................... 10 2007 049 251

(51) Int. Cl.
F03D 9/00 (2006.01)
H02P 9/04 (2006.01)
F03B 13/00 (2006.01)

(52) U.S. Cl. ............................ 290/44; 290/54; 290/55

(58) Field of Classification Search .................. 290/44, 290/54, 55
See application file for complete search history.

(56) References Cited

U.S. PATENT DOCUMENTS

| 5,329,221 | A | * | 7/1994 | Schauder | 323/207 |
| 5,384,696 | A | * | 1/1995 | Moran et al. | 363/40 |
| 5,428,283 | A | * | 6/1995 | Kalman et al. | 318/729 |
| 5,734,257 | A | * | 3/1998 | Schauder et al. | 323/207 |
| 6,977,827 | B2 | * | 12/2005 | Gritter | 363/40 |
| 7,339,355 | B2 | * | 3/2008 | Erdman et al. | 322/29 |
| 7,432,686 | B2 | * | 10/2008 | Erdman et al. | 322/44 |
| 7,786,691 | B2 | * | 8/2010 | Garlow et al. | 318/629 |
| 8,242,620 | B2 | * | 8/2012 | Kikuchi et al. | 290/44 |
| 2004/0010350 | A1 | | 1/2004 | Lof et al. | 700/292 |
| 2005/0207190 | A1 | * | 9/2005 | Gritter | 363/40 |
| 2006/0028025 | A1 | * | 2/2006 | Kikuchi et al. | 290/44 |
| 2007/0187955 | A1 | * | 8/2007 | Erdman et al. | 290/44 |
| 2008/0018309 | A1 | * | 1/2008 | Erdman et al. | 322/20 |
| 2010/0259045 | A1 | * | 10/2010 | Vilbrrandt | 290/44 |
| 2011/0266799 | A1 | * | 11/2011 | Kikuchi et al. | 290/44 |

FOREIGN PATENT DOCUMENTS

DE 102007049251 A1 * 4/2009

OTHER PUBLICATIONS

Magueed, F. et al. (2006). "Operation of Distributed Generation in Weak Grids with Local Critical Load," IEEE Industrial Electronics, IECON 2006—32$^{nd}$ Annual Conference, Piscataway, NJ, Nov. 1, 2006, pp. 2414-2419.

Iwanski, G. et al. "Synchronization and Mains Outage Detection for Controlled Grid Connection of the Wind Driven Variable Speed Power Generation System," STET ICCEP '07, International Conference on, IEEE, PI, May 1, 2007, pp. 585-590.

International Search Report dated Oct. 6, 2009, directed to counterpart International Application No. PCT/EP2008/008545; 4 pages.

* cited by examiner

*Primary Examiner* — Pedro J Cuevas
(74) *Attorney, Agent, or Firm* — Morrison & Foerster LLP

(57) ABSTRACT

A network disturbance module for a control device of a wind energy installation having a generator driven by a wind rotor and a converter for producing electrical power fed into a network. The module includes a measurement device configured to measure at least one electrical parameter of the network, a detector configured to identify a network disturbance and output a switching signal, and a reference generator configured to produce a substitute reference vector for the converter based on the at least one electrical parameter. The module also includes a fault management unit comprising a fault classifier, the unit being configured to interact with the measurement device, detector, and reference generator such that, in the event of an undervoltage during island operation, a quick-action frequency regulator is activated. The regulator acts on the converter to vary a real-power feed P in the event of a discrepancy in a network frequency.

15 Claims, 4 Drawing Sheets

WIND TURBINES HAVING CONTROL FOR NETWORK FAULTS AND OPERATING METHOD THEREOF

REFERENCE TO RELATED APPLICATIONS

This application is a national stage application under 35 USC 371 of International Application No. PCT/EP2008/008545, filed Oct. 9, 2008, which claims the priority of German Patent Application No. 10 2007 049 251.2, filed Oct. 12, 2007, the contents of which prior applications are incorporated herein by reference.

FIELD OF THE INVENTION

The invention relates to a wind energy installation having a generator, which is driven by a wind rotor, and having a converter for producing electrical power, which is fed into a network, and having a control device.

BACKGROUND OF THE INVENTION

In electrical power transmission and distribution networks, it must always be expected that short circuits can result in island network formation. In an island network, the voltage, frequency and the phase are no longer synchronized to the corresponding parameters in the main network. In particular on reconnection after clearing of the network fault, this can lead to high equalizing currents flowing, which can result in overloading of or damage to components. Furthermore, in the case of conventional power stations with synchronous generators, there is a risk of the discrepancies in the island network becoming so great that the generator will stall on connection to the rest of the network.

Wind energy installations are frequently provided at locations where there is a large amount of wind and the population density is low. In many cases, this results in the wind energy installations having to be connected via relatively long spurs, with only little networking, of a power transmission network. Because of this arrangement, wind energy installations are relatively easily affected by island formation in the network in the event of any disturbance.

This applies both to wind energy installations positioned individually and to a plurality of wind energy installations combined to form a wind farm.

When wind energy installations are arranged in the island network, then the network frequency in them can easily rise relatively quickly. One significant factor in this case is that wind energy installations—in contrast to the synchronous generators which are used in conventional power stations—have only a small mass inertia. Because of the greater discrepancy, equalization processes can occur to a more considerable extent on reconnection, thus resulting in the risk of damage.

SUMMARY OF THE INVENTION

The invention is based on the object of improving wind energy installations of the type mentioned initially such that they have a better response to short circuits and island formation in the network.

The solution according to the invention lies in the features broadly disclosed herein. Advantageous developments are described in the disclosure below.

In the case of a wind energy installation having a generator which is driven by a wind rotor, and having a converter for producing electrical power, which is fed into a network, and having a control device, the invention provides that the control device has a network disturbance module which comprises a measurement device for at least one electrical parameter of the network, a detector for identifying a network disturbance and for outputting a switching signal, a reference generator which produces a substitute reference vector for the converter on the basis of the parameter determined by the measurement device, and a fault management unit which has a fault classifier and interacts with the other components such that, in the event of an undervoltage during island operation, a quick-action frequency regulator is activated, which acts on the converter in order to vary the real-power feed in the event of a discrepancy in the network frequency.

The invention operates as follows: the measurement device measures electrical parameters of the network and uses them to determine the frequency and/or phase angle. The measurement device is preferably designed such that it still produces the network frequency and phase angle in the event of a network fault. On the basis of this signal and, if desired, further signals such as the voltage or current or a signal which is externally predetermined, the detector can determine whether an island network has formed. If, on the basis of the signals, the detector identifies island network formation, then it outputs the appropriate switching signal. The reference generator is designed to produce a reference value which is applied as a reference vector to the converter. The reference value is produced throughout the time period of the network disturbance found by the detector. In this case, for example, it may be a phase variable, a rotating vector or a fixed vector. In the event of a network failure, the converter can still be operated with the reference vector, in the same way as a network commutated converter. Even in the event of a severe voltage drop with a very low residual voltage (short circuit), for example below a threshold of 5-15% of the rated voltage, it is therefore still possible to further feed power into the network, while conventional wind energy installations would have to cease further feeding because they could not reliably identify the phase angle at a voltage as low as this. The invention therefore allows the network to be supported by a further feed even in the event of a severe voltage drop with a low residual voltage.

The fault classifier is designed to distinguish between different types of network disturbances. If, in conjunction with the detector, the fault classifier identifies island network formation, then the frequency regulation unit is activated via the fault classifier. This frequency regulation unit is designed to regulate the frequency of the power emitted from the converter at a desired value with a fast time constant (less than 100 ms). The frequency regulation unit accomplishes this by using the converter to vary the real-power that is fed in, to be precise such that both the frequency and preferably also the phase angle of the voltage are regulated at a nominal value.

A number of the terms used will be explained in the following text.

An island network means a network fault in which a part of the network to which the respective wind energy installation is connected is no longer connected to the entire network in such a manner that the voltage and frequency conditions are the same.

A reference vector means a control signal for the converter, which contains one or more elements which govern a switching behavior of the converter and therefore the real power/reactive power output from the converter.

Quick-action regulation means regulation which has a time constant which is shorter by at least one order of magnitude than conventional frequency regulation. This preferably relates to time constants of 100 ms or less. This can be achieved, for example, by storing nominal curves, functions or tables in the frequency regulation unit, which, for example, reduce the real power fed in as the frequency rises.

The essence of the invention is based on the idea of combining three different aspects. The first aspect is to identify a network fault, and therefore the possible formation of an island network. The second aspect is to provide a dedicated reference value with respect to the network frequency and phase for the wind energy installation, such that it is not instructed via the network to carry out a control function—which is no longer available at all as a consequence of the network fault. The third aspect is to provide quick-action frequency regulation in the event of island network formation, which regulates the wind energy installation with its converter such that the output electrical power is at a frequency, and as far as possible also at a phase angle, which matches that according to the reference value. This means that the frequency regulator varies the real power fed in such that the control difference is as close to the value zero as possible. This means that, even in the event of temporary island network formation, the converter maintains a network frequency (and possibly phase angle) such that it is synchronized to the rest of the network. Equalizing currents, such as those which occur after fault clearing, do not occur, or occur only to a minor extent, thanks to the invention. This is a considerable advantage over conventional wind energy installations which frequently do not identify island network formation at all, and in which the converter cannot then maintain the frequency of the rest of the network owing to lack of control by the network and lack of inertia. This then leads to frequency discrepancies and to considerable equalizing currents after fault clearing. Thanks to the invention, wind energy installations with converters therefore maintain stability in the event of network faults, such as voltage drops or short circuits with island network formation, which stability is comparable to that of large conventional power stations with synchronous generators which have a considerable extent of natural frequency stability because of their mass inertia. Wind energy installations can therefore continue to operate virtually in synchronism with the rest of the network in the event of short circuits and temporary formation of an island network occurring in this case, such as those which occur particularly when wind energy installations are connected to long network spurs, which are not networked.

The fault management unit preferably also comprises a voltage regulator which is designed to regulate the voltage of the electrical power output from the converter by varying the reactive power that is fed in. The voltage can therefore be regulated at a nominal value. In this case, the nominal value is expediently an element of the reference vector which is determined by the reference generator, and corresponds approximately to the voltage in the network before the network fault occurred. If regulation at a value such as this cannot be achieved, then an auxiliary operating mode is expediently provided for the voltage regulator, in which the voltage is regulated at a maximum value which still does not lead to overloading of the converter.

The fault management unit is furthermore expediently designed such that the converter can be controlled using the reference vector as a substitute, in the event of a short circuit.

A network following unit can interact with the fault management unit. The network following unit is designed to limit a difference angle between the phase angle in the network and the phase angle of the power fed in from the wind energy installation converter. For this purpose, it expediently has an angle offset detector, by means of which a difference is formed from signals for the frequency in the network and at the converter, thus determining an angle offset, and has a limiter which restricts the angle offset to a predeterminable difference angle. If an island network is formed in the event of a network disturbance, which island network also contains other generators in addition to the wind energy installation, then the frequency and phase in the network are not governed solely by the wind energy installation, in such a way that it can come to a decision. A difference angle occurs in this case which is governed inter alia by the power fed into the island network from the wind energy installation, and by the type and number of loads. The network voltage angle can be varied by adjusting the angle at which the wind energy installation converter feeds into the network. However, in this case, changes in the network angle must not become excessive, in order to avoid overloading the wind energy installation with respect to the power fed in, and control oscillations because of the excessively rapid change.

The fault management unit is advantageously designed to identify an end of the network fault and to output a second switching signal to the fault management unit. The profile of the network voltage and/or the change of the phase angle are/is monitored for this purpose. In the event of a rapid further rise or a sudden change, the quick-action frequency regulation can be ended, and the real power can be regulated again in the same way as before the occurrence of the fault. In order to achieve a transition which is as smooth as possible in this case, the fault management unit preferably has a transit module which returns the real power to a preset value, by means of a transitional function, for example a ramp function, when the quick-action frequency regulation ends. The preset value may be a currently demanded value, such as the value that is present in the network, or the original value before the network fault occurred.

The fault management unit advantageously has an input channel via which at least the frequency and/or phase angle can be preset during island operation. The wind energy installation can therefore be controlled externally, if desired. This is a particular major advantage when not just a wind energy installation but a wind farm having a plurality of wind energy installations is intended to be controlled, or wind energy installations are intended to be synchronized to one another. In a corresponding manner, the fault management unit also has an output channel via which the reference vector is output during island operation. External control centers or other wind energy installations can therefore be informed of the frequency, phase angle and/or voltage in order in this way to allow them to be synchronized.

The fault management unit preferably has a time module which is used to control the response of the wind energy installation when a network fault occurs, to be precise expediently as a function of further conditions. For example, it is possible to run the wind energy installation down, or to disconnect it from the network, after a predeterminable time period has passed or a time-dependent voltage and/or frequency limit characteristic is undershot. The time module for this purpose expediently interacts with the fault classifier. It can be designed such that, in the event of a persistent low voltage close to zero, the wind energy installation is disconnected from the network only after a variable first, relatively short, time period, and continues to feed until then. This case is particularly important when there is a short circuit very close to the wind energy installation, in the case of which it cannot be assumed that the short circuit will be cleared quickly. Rapid disconnection makes it possible to ensure that power is not fed into a short circuit close to the wind energy installation, for an unacceptably long time. Conversely, when the voltage rises by a certain amount, this is an indication that the fault is further away from the wind energy installation. It can then be assumed that fault clearing is possible, which means that a longer time period can be provided before the wind energy installation is disconnected. After a predeterminable second time period, a check is carried out to determine whether a persistent undervoltage (for example of less than 50% of the rated voltage) is present. A severe uncleared network fault can then be assumed, and the wind energy installation is run down. If island operation is identified, the wind energy installation can likewise be run down after a specific third time period has elapsed; however, the possibility should not be precluded of operation being continued and of operation being run down only in response to an external signal. The wind energy installation is therefore switched off only later, or not at all. The operational reliability of the overall network is therefore increased, since more wind energy installations continue to feed in the network faults.

The network disturbance module can advantageously have a synchronization module, when the wind energy installation is adjacent to other wind energy installations, as in the case of a wind farm. The synchronization module is connected to the fault management unit and to the frequency regulator and interacts with them in such a way as to match the reference vector with an external point. Matching makes it possible to identify and compensate for undesirable discrepancies between the wind energy installations, such as those which occur because of unavoidable differences between signal detection and processing, because the accuracy is not ideal. Furthermore, the frequency and phase angle, and possibly the voltage as well, are detected and stored with a time stamp as a vector. This makes it possible to determine angle differences between the wind energy installations. The synchronization module preferably has a time reference for this purpose. However, the possibility should not be precluded of making use of a time module of the fault management unit. In order to make contact with the other wind energy installations, with a farm master when the wind energy installation is installed in a wind farm, or with some external point, for example the network operator's control center, the synchronization module advantageously has a communication unit. However, in order to avoid complexity, it can also interact with the fault management unit such that its input and output channel is used for synchronization.

The generator may be of any desired type, for example a synchronous generator, an asynchronous generator or preferably a double-fed asynchronous generator. The latter offers the advantage that the quick-action frequency regulator could if required even act on both of the inverters in the converter in order to achieve a quick frequency change with real power being fed in or consumed as appropriate.

Furthermore, a chopper (a circuit for destruction of energy in the intermediate circuit of the converter) can expediently be provided, with the quick-action frequency regulation acting on the chopper. When the chopper is operated, energy is destroyed, that is to say real power is reduced, thus making it possible to affect the frequency quickly and efficiently. Additionally or alternatively, a controllable resistance can also be provided as a load, and likewise be used to reduce the real power.

The invention furthermore relates to a method for operating a wind energy installation having a generator, which is driven by a wind rotor, and a converter for producing electrical power which is fed into a network, having the following steps: measurement of at least one electrical parameter of the network, detection of island network formation with the output of a switching signal, generation of a reference value as a reference vector for the converter based on the measured parameter for the converter, classification of a fault on identification of the switching signal, wherein, in the event of a short circuit fault, the converter is controlled by the reference vector rather than the network, in order to feed in electrical power, and, in the event of an undervoltage fault during island operation, quick-action frequency regulation is carried out, in which the network frequency is regulated by varying the real power that is fed in.

For a more detailed explanation of the method and advantageous developments, reference is made to the above statements.

The invention also extends to a wind farm having a plurality of wind energy installations, having a farm master, wherein the network disturbance module is arranged in the farm master, and to a method for operation of this wind farm. Values of the real power and possibly of the reactive power are determined for individual wind energy installations in the farm, are transmitted to the wind energy installations, in this way resulting in the desired frequency regulation and/or voltage regulation as described in more detail above. In order to synchronize the wind energy installations, they expediently communicate with the farm master. However, they can also communicate with one another, thus improving the operation reliability in the event of a failure of the farm master. However, it is also possible to provide for communication with a point outside the farm, such as the network operator's control center and to use values from there for synchronization. This offers the advantage that the wind farm can still be operated in synchronism with the network when an island network exists for a relatively long time.

BRIEF DESCRIPTION OF THE DRAWINGS

The invention will be explained in the following text with reference to the attached drawings, which illustrate one advantageous exemplary embodiment of the invention, and in which.

DETAILED DESCRIPTION OF THE INVENTION

Figure 1:
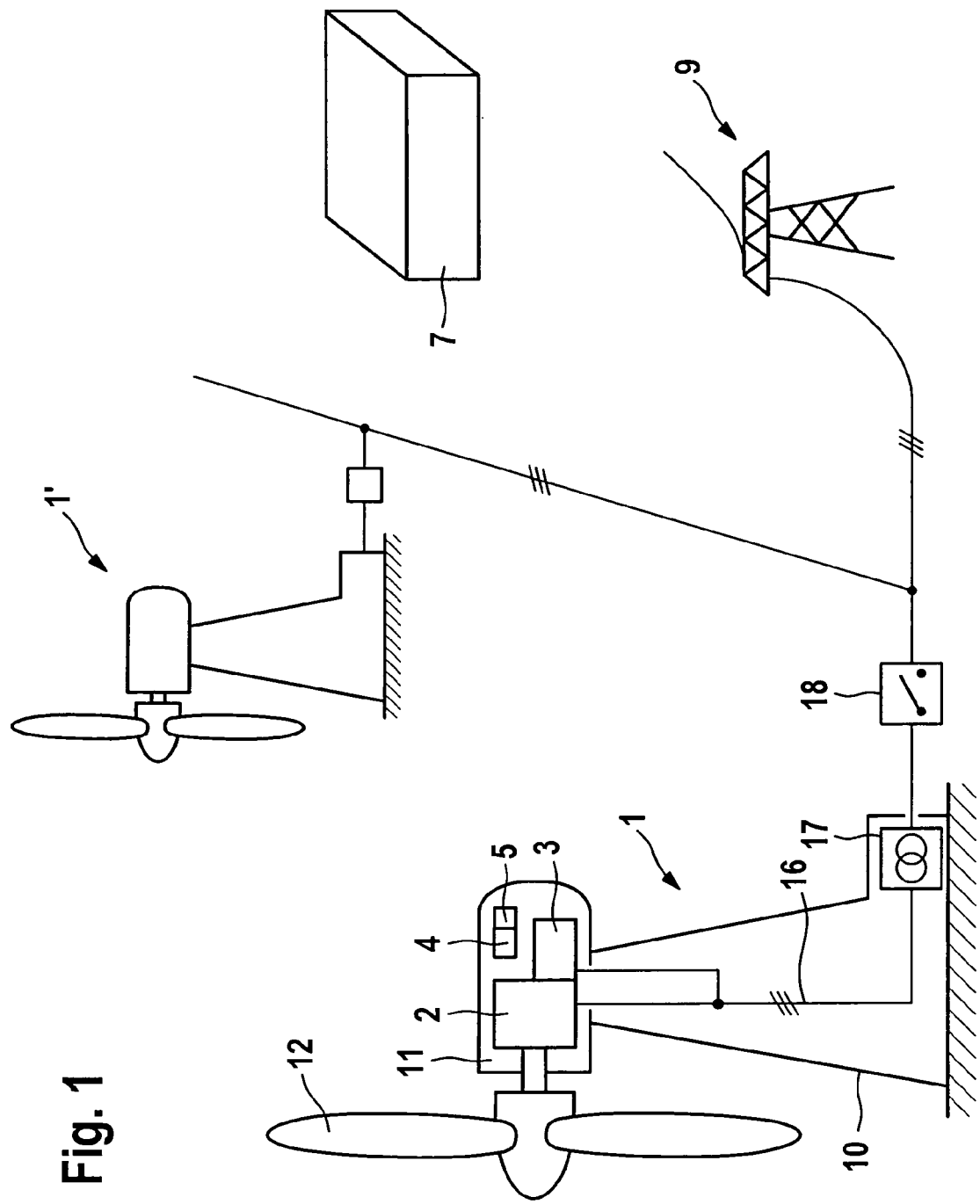
FIG. 1: shows a schematic view of a wind energy installation according to one exemplary embodiment of the invention.

A wind energy installation according to a first exemplary embodiment of the invention comprises a tower 10 having a machine house 11 which is arranged at the upper end of the tower 10, such that it can pivot. A wind rotor 12 is arranged on the end face of the machine house 11 such that it can rotate, and drives a wind energy installation generator 2 via a rotor shaft (not illustrated). The generator 2 is connected to a converter 3. A control device 4 is also arranged in the machine house 11, and is connected via signal lines (not illustrated) to the generator 2 and to the converter 3, as well as to external signal sources (not illustrated).

The rotor 12 is driven by the wind and supplies mechanical energy via the rotor shaft to the generator 2, which correspondingly produces electrical power. The generator 2 is preferably a double-fed asynchronous machine with a stator winding and a rotor winding.

The stator winding is connected to a connecting line 16, which is connected to a power distribution network 9 via a medium-voltage transformer 17 at the foot of the tower 10, and a switching contactor 18. The machine-side inverter 31 in the converter 3 is connected to the rotor winding of the generator 2, and is connected via an intermediate circuit 32 to a network-side inverter 33 in the converter 3. The latter is connected to the connecting line 16. A chopper 34 is also connected to the intermediate circuit 32, in response to a switching signal draws electrical energy from the intermediate circuit 32, and converts this to heat.

The control device 4 is designed to control the converter 3 as a function of various requirements, in particular to monitor the real power and reactive power produced by the converter 3. The control device 4 can be supplied with control and/or reference variables from a superordinate operating control system (not illustrated) and/or a farm master 7, to which it is connected via communication connections (not illustrated). It is also possible to provide for external control signals to be applied, for example by means of remote data transmission (not illustrated).

Figure 2:
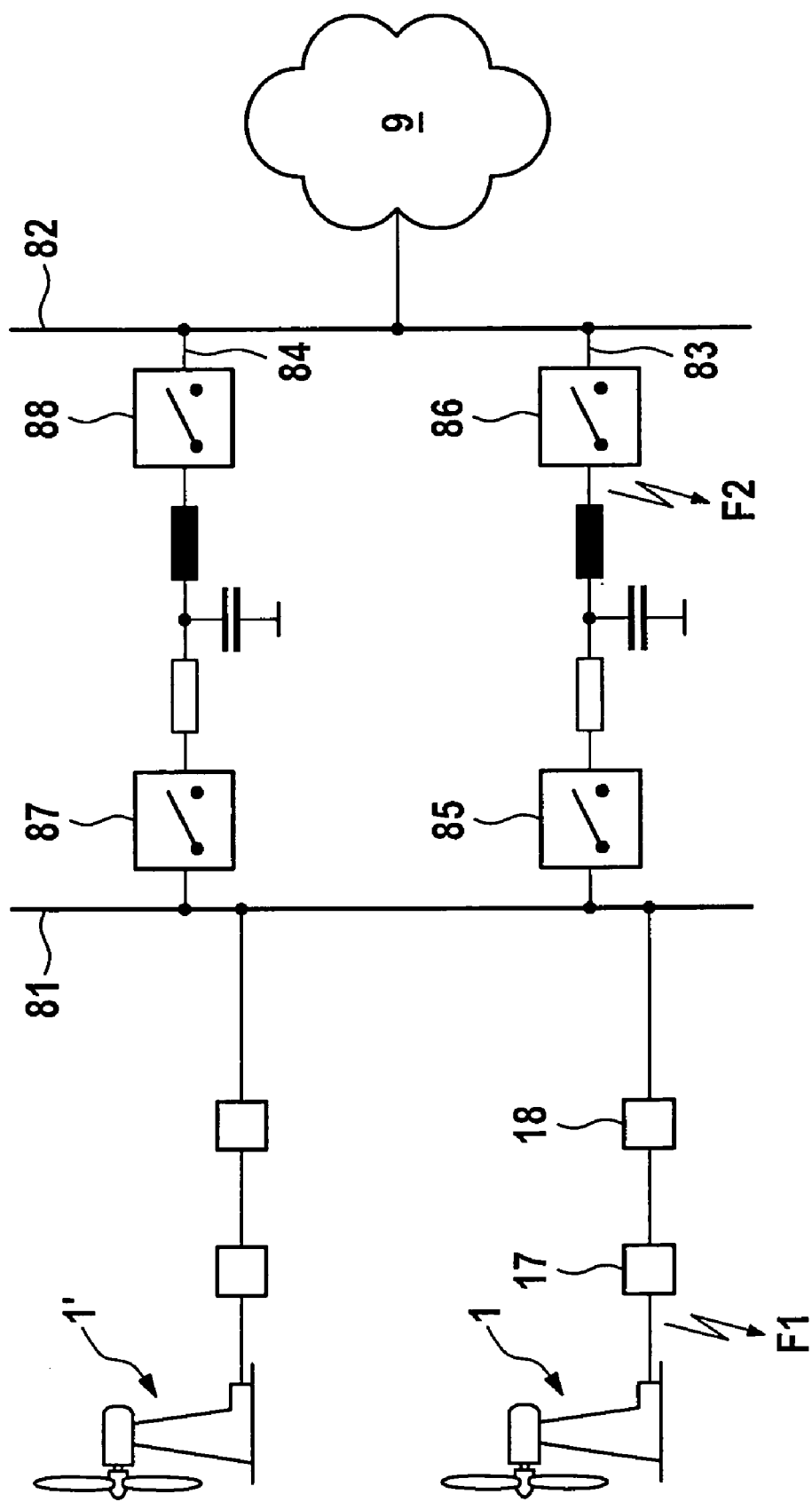
FIG. 2: shows a schematic illustration of the connection of a wind energy installation to a network.

FIG. 2 illustrates in more detail the connection of a wind energy installation 1 (or of a wind farm; for simplicity, reference is made only to the wind energy installation) to the power distribution network 9, as illustrated, but only in a roughly schematic form, in FIG. 1. The wind energy installation 1 is connected via its medium-voltage transformer and the switching contactor 18 to a first busbar 81. By way of example, the busbar may be an internal connection network in a wind farm, to which further wind energy installations 1' are connected. The first busbar 81 is connected to a second busbar 82 via a plurality of connecting lines 83, 84, for example two connecting lines 83, 84 in the illustrated example. The connecting lines 83, 84 may be short, but in most cases have a considerable length, which means that their resistance and reactance (represented by equivalent components in FIG. 2) are not negligible. At their two ends, the busbars 81, 82, of the two connecting lines 83 and 84 each have a switching element 85, 86, 87, 88. The second busbar 82 is connected to the power distribution network 9, to be precise possibly via a high-voltage transformer (not illustrated).

Furthermore, by way of example, FIG. 2 shows two locations of possible network faults, represented by lightning symbols F1 and F2. The behavior in the event of faults will be explained briefly in the following text. Two types of faults are to be considered: a first fault F1 close to the wind energy installation 1, and a second fault F2 close to the second busbar 82. The faults are assumed to comprise the occurrence of a short circuit. The short circuit results in the voltage in this area collapsing to virtually zero, and possibly in the wind energy installation generator feeding the short circuit.

The response of a conventional wind energy installation to both faults will be explained in more detail first of all: if a short-circuit fault occurs in the area F1, then the remaining voltage at the wind energy installation decreases considerably. It becomes so low that this could result in disconnection of the conventional wind energy installation. After disconnection, the conventional wind energy installation cannot carry out resynchronization again, with power being fed into the network again, until an adequate voltage level is reached in the area of the busbar 81. It is now assumed that a fault F2 occurs in the second busbar 82. Because of the greater distance, the remaining voltage at the wind energy installation is still sufficiently high (above a threshold of about 5 to 15% of the rated voltage) to allow the wind energy installation converter to continue to feed electrical power into the network. However, wind energy installations are generally subject to the problem that frequency changes and phase discrepancies occur quickly because the mass inertia is low in comparison to conventional power stations with synchronous generators. This results in a phase difference and an increase in the frequency in the area of the relevant wind energy installation.

Without any additional measures, conventional wind energy installations with a converter are therefore unable to keep the network frequency and phase angle synchronized to the rest of the network. After fault clearing, this means that considerable equalizing currents can occur, because of the different frequency and phase angle. According to the invention, a network disturbance module 5 is provided in order to counter this.

Figure 3:
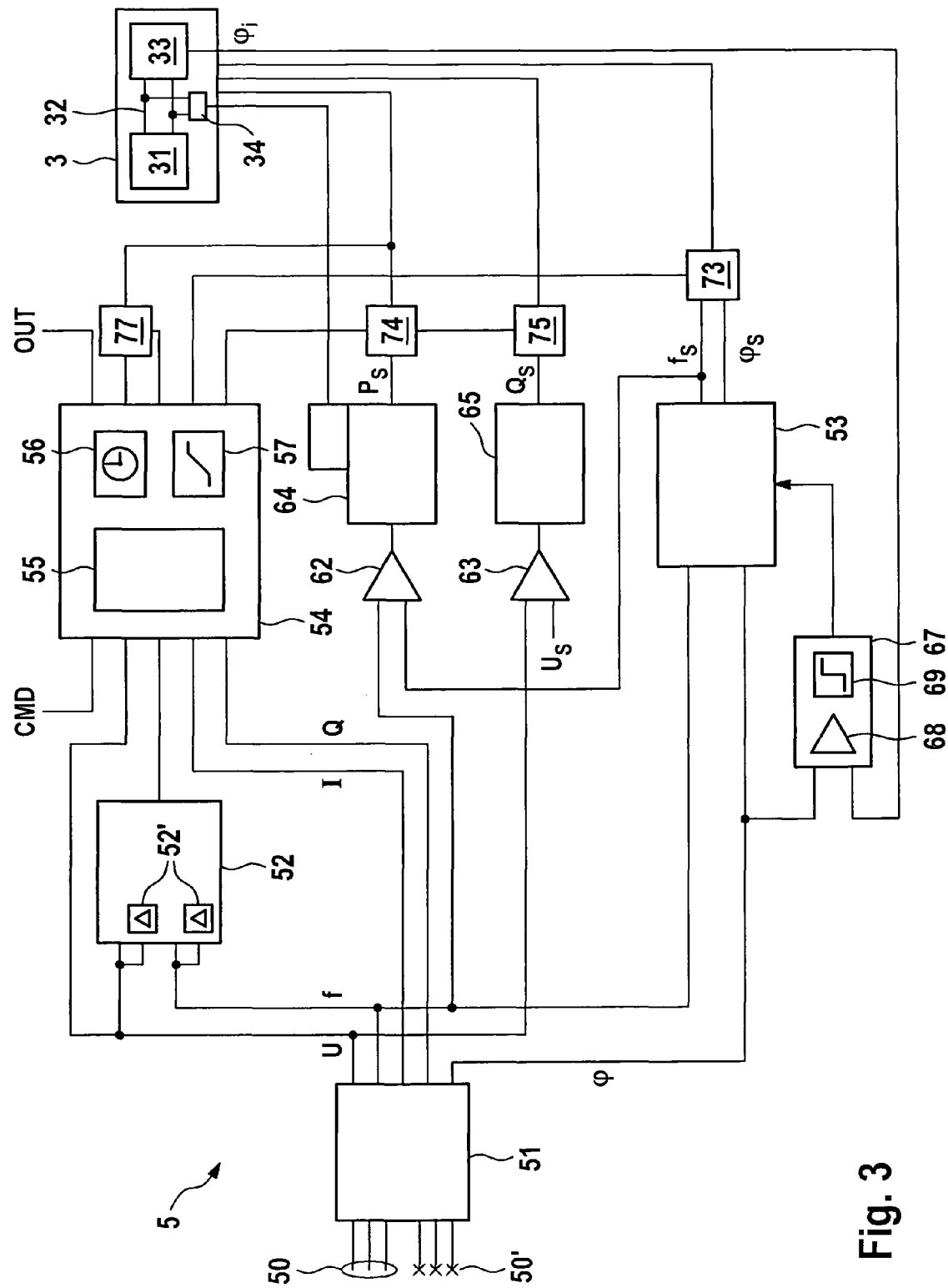
FIG. 3: shows a schematic illustration of a network disturbance module according to the invention.

FIG. 3 shows the network disturbance module 5, whose design and method of operation will be explained in more detail in the following text. Measurement sensors 50, 50' for voltage and current in the individual phases of the network are arranged on the network side of the medium-voltage transformer 17. Their measurement signals are applied as an input signal to the measurement device 51. The measurement device 51 uses them to determine parameters for the network voltage U, its frequency F and phase angle $\phi$. The signal for the network voltage U and that for the network frequency f are applied to the detector 52. The detector 52 contains subtraction stages 52' for the input signals, as a result of which, a voltage change signal $\Delta U$ is also produced in addition to the absolute value for the network voltage U, and a network frequency change signal $\Delta f$ is also produced in a corresponding manner, in addition to the absolute signal for the network frequency. It should be noted that alternatively, network currents can also be used, in addition to the voltage. On the basis of the applied signals, the detector 52 uses the magnitude or a change in the frequency and/or uses the magnitude or a change in the voltage U to determine whether an island network has been formed from the network 9 to which the wind energy installation 1 is connected. On identification of the formation of an island network, the detector 52 outputs an appropriate switching signal at its output.

The signals produced by the measurement device 51, for the frequency f and for the phase angle $\phi$ are applied as input signals to the reference generator 53. This reference generator 53 uses them and an oscillating device, such as a stabilized oscillator, a PLL or a high-precision radio clock, to produce a continuous reference value for the network frequency. The reference generator 53 is in this case designed such that the reference value is still produced even when there are no signals from the measurement device 51. The reference value comprises a frequency signal $f_s$ and a phase signal $\phi_s$. It is output as a reference vector at the output of the reference generator 53, and is applied via a switching element 73 to the converter 3. This passes on the reference vector, as a function of an applied control signal.

The switching signal produced by the detector 52 for the formation of an island network is applied to one input of the fault management unit 54. Signals for the network voltage and optionally further signals for the current flow into the network and the reactive power Q fed are applied to further inputs. A further input can be provided as an input channel for reference signals CMD, for example for running down the wind energy installation. The fault management unit 54 comprises a fault classifier 55, a time module 56 and a transit module 57. The fault classifier 55 uses the applied input signals to determine whether and possibly what network disturbance is present, and to select a suitable method of operation. Operating states and/or parameters, for example for the voltage U and the frequency f, can be output via an output channel OUT.

A quick-action frequency regulator 64 is provided for operation in the event of island network formation and comprises a subtraction element 62, to whose inputs the network frequency signal f determined by the measurement device 51 and a signal for a nominal network frequency which is produced by the reference generator 53, are applied. The frequency regulator 64 is designed to regulate the real power P to be fed in from the converter 3, in the event of discrepancies between the measured frequency and the nominal frequency, with a short time constant, preferably of 10 to 50 ms. For this purpose, at its output, the frequency regulator 64 produces a signal for a nominal real power $P_s$, which is applied via a switching element 74 to a control input of the converter 3. Furthermore, the frequency regulator is connected via a control line to the chopper 34 in the converter 3. If required, it can destroy energy by operating the chopper 34, that is to say it can quickly reduce the real power, in order in this way to quickly and efficiently prevent the frequency from rising excessively.

Furthermore, a network following unit 67 is provided and comprises an angle offset detector 68 and a limiter 69. The angle offset detector 68 has two inputs to which, respectively, a signal for the angle (phase angle) in the network, as determined by the measurement device, and the phase $\phi_1$ of the converter 3, are applied. A signal for the angle offset (difference angle) is formed from the difference. This signal is applied to the limiter, which limits its magnitude and, possibly, also its rate of change to limit values, and outputs this at the output of the network following unit. The output signal is applied to the reference generator 53. This results in the phase of the reference vector being varied such that the converter 3 feeds electrical power in with a phase angle such that the limit values are not exceeded.

Furthermore, an optional additional voltage regulator 65 is provided, and comprises a subtraction element 63 which forms a difference between the actually measured network fault U and an applied nominal voltage value $U_s$. The voltage regulator 63 is designed to use the voltage difference to determine a nominal reactive power $Q_s$, which is applied as a control signal via a switching element 75 to the converter 3.

The methods of operation will be explained in more detail in the following text with reference to FIG. 3. The current and voltage of the network are measured by means of the measurement device 51 and are used to determine signals for the network frequency f and the phase angle $\phi$. The reference generator 53 uses the frequency and phase signals determined in this way to produce a continuous reference value. This can be used as a reference vector for operating the converter 3. Furthermore, the detector 52 evaluates the signals determined by the measurement device 51 for the voltage and the frequency and/or phase, and outputs an output signal when island network formation is identified. If no island network formation is identified, the process described above is repeated. If island network formation is identified, then a switching signal is applied to the fault classifier 55. From the signal for the voltage U which is likewise applied to it, the fault classifier 55 determines whether the voltage is below the threshold which has been set for safe identification of the voltage (for example 5 to 15% of the rated voltage of the network 9). In this case, in a first method of operation, the fault classifier 55 switches on the switching element 73, as a result of which the reference vector produced by the reference generator 53 is applied to the converter 3. The converter 3 therefore still feeds current in while, in the prior art, the further feed is stopped when the voltage is below the threshold.

If, in contrast, the voltage U is above the predetermined threshold, then, if the detector 52 identifies island network formation, the fault classifier 55 activates the quick-action frequency regulation according to the invention. The switching element 74 is switched on for this purpose. The quick-action frequency regulation attempts to regulate the network frequency at the desired value again, with a time constant in the region of a few tenths of milliseconds. The frequency regulator 64 accomplishes this by using a control signal to vary the real power P fed in from the converter 3. In this case, it is optionally possible not only to regulate the frequency f but also, in fact, to use the phase $\phi$. The nominal value of the phase angle can be produced by the reference generator 53. A control discrepancy is determined from the difference, leading to appropriate variation of the real power P fed in from the converter 3. If the method of operation with voltage regulation by operation of the switching element 75 is additionally activated, the actual voltage is measured in a corresponding manner, and is compared with a nominal value. A reference value, determined by the measurement device 51, for the voltage before the occurrence of the network fault can be used as the nominal value. Where this reference value has been obtained from the voltage before the occurrence of the network fault, this may, for example, be a mean value over a predeterminable time period of values before the network fault, in which case the values were measured before the occurrence of the network fault and were stored in the wind energy installation control system. The voltage regulator 65 uses the determined voltage difference to form a control signal which is applied via the switching element 75 to the converter 3, such that the reactive power produced by the converter is varied as a function of the voltage difference. Provision is expendiently made for regulation at a specific maximum value, which does not lead to overloading of the converter, if the voltage difference is excessive.

When the network fault is cleared, which the fault classifier 55 can determine, for example, on the basis of a rapid rise in the voltage U again or a sudden change in the phase angle $\phi$, then the fault management unit 54 ends the quick-action frequency regulation by switching off the switching elements 73, 74, 75, and the real power to be fed in from the converter 3 is once again set to the value before the fault occurred, or to an external preset value. A transit module 57 is provided for this purpose and, for example, implements a ramp function. The corresponding control signal produced by the transit module 57 is transmitted to the converter 3 via the switching element 77, which is in this case switched on by the fault classifier 55.

By interaction with time module 56, the fault classifier 55 checks whether the voltage is still locked at a value close to zero, despite reactive power being fed in, within a variable first time period of, for example, 150 ms after the occurrence of the fault. If this is the case, then the fault classifier identifies a short circuit in the vicinity of the wind energy installation 1 (fault case F1) and, after this first time period has elapsed, outputs a signal to disconnect the wind energy installation 1 from the network (for example by opening the switching contactor 18). This makes it possible to ensure that electrical power cannot be fed for an unacceptably long time into a short circuit close to the wind energy installation 1. In contrast, if the voltage U rises above an adjustable limit value after reactive power has been fed in, then the fault classifier 55 identifies that the fault is at a relatively long distance from the wind energy installation 1 (fault case F2). The wind energy installation 1 can then be operated for a longer time period, as a result of which additional power is fed into the network, which is advantageous for maintaining the operational reliability of the network. It is expedient for the fault classifier 55 to activate the input channel in this case. This makes it possible to externally preset frequency nominal values which are then adopted as appropriate. The electrical variables in the island network can then be resynchronized with those in the network 9. Furthermore, provision is preferably made for the fault classifier 55 to output actual values for the frequency and voltage via the output channel OUT, in order to make it possible to match the regulation of the frequency and voltage in the island network to other power generators, such as other wind energy installations. Furthermore, the fault classifier 55 checks whether the network voltage rises above a voltage threshold of, for example, 50% of the rated voltage after a predeterminable second time period, preferably of 400 ms. If it does not rise above this value, then fault classifier 55 identifies a serious fault, which has not been cleared, in the network and outputs a switching signal to run down the wind energy installation. In contrast, if island operation with a voltage above the threshold is possible, the wind energy installation is run down only in response to an external command signal.

Figure 4:
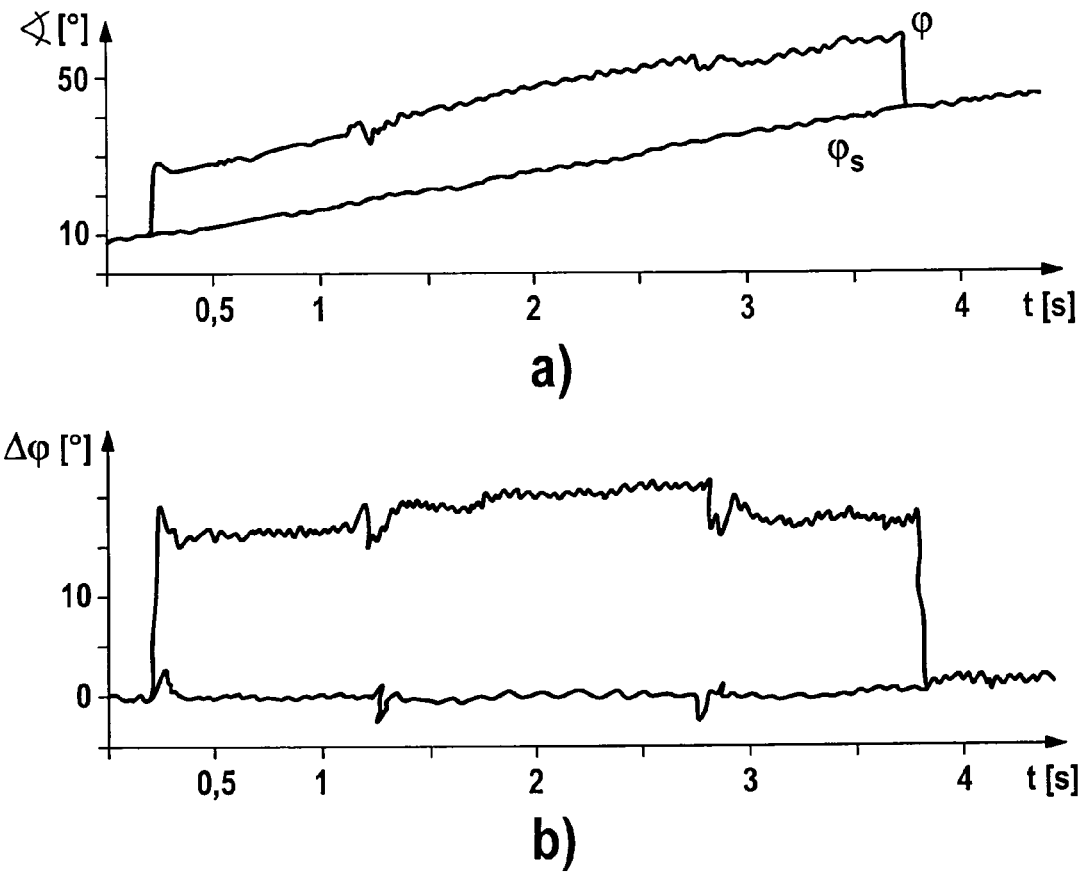
FIG. 4: shows graphs of phase angles in the network during a network fault.

FIGS. 4a and b show characteristics for the operation of the quick-action frequency regulation according to the invention in the event of network faults. FIG. 4a shows the angle of the network voltage q and the reference angle $\phi_s$, as produced by the reference generator 53, during a network disturbance. This clearly shows the onset of the disturbance at 0.2 s and the end of the disturbance at 3.8 s, by sudden changes in the angle of the network voltage through about 15 to 20°. FIG. 4b shows the angle change $\Delta\phi$ of the network voltage without (upper line) and with (lower line) the quick-action frequency regulation according to the invention. As can be seen, the control difference between the nominal value and the actual value of the phase angle is regulated out to a value close to zero with a short time constant by the quick-action frequency regulator 64.

Figure 5:
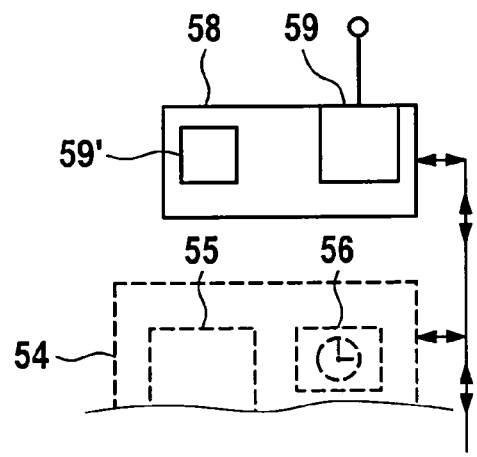
FIG. 5: shows an optional extension of the network disturbance module as shown in FIG. 3.

FIG. 5 shows an optional addition to the network disturbance module 5. A synchronization module 58 is additionally provided, which is connected via a data line to the fault classifier 55, to the frequency regulator 64 and to the voltage regulator 65 (neither regulator is illustrated in FIG. 5). The synchronization module preferably in each case comprises a dedicated communication unit 59 and a time reference 59', but can also communicate via the fault classifier 55, and can receive time signals from its time module 56. The synchronization module 58 is used to connect the wind energy installation to the farm master 7, or to an external control point, such as the control center of an operator of the network 9 and/or to other wind energy installations 1', which are preferably arranged in the same wind farm. The synchronization module 58 matches the reference vector of its own wind energy installation to the other wind energy installations 1' and/or to the farm master 7 (or the control point). For this purpose, the synchronization module 56 is designed such that it provides the instantaneous reference vector with a time stamp, which is produced from the time reference (or by the time module 56), and outputs this via the communication unit 59. Conversely, the synchronization module 58 receives corresponding signals from the other wind energy installations and/or the farm master 7 (or the control point). The time stamp is extracted, and the instantaneous reference vector is calculated taking account of the time information, and is output to the fault classifier 55.

Various variants can optionally be provided in this case. In a first variant, the farm master 7 centrally outputs the reference variables for voltage, frequency and phase angle. These variables are likewise detected, and discrepancies calculated from them are stored, at the individual wind energy installations. When a network fault occurs, the reference vector determined by the network disturbance module 5 is matched to the reference vector of the farm master 7. This is done taking account of the stored discrepancies such that at least the frequency is made to match, and the phase angle is recalculated if necessary, depending on the instantaneous values of the voltage and current and the electrical characteristics, for example of the connecting lines 83, 84. In a second variant, the synchronization is carried out on a decentralized basis. For this purpose, the synchronization module 58 of a wind energy installation 1 communicates with at least one other wind energy installation 1'. In this case, a communication structure can be provided, in the form of a chain of the single wind energy installations 1, 1', or a network in which each of the wind energy installations 1 communicates with previously defined adjacent wind energy installations 1'. In a third variant, the communication takes place with an external point outside the wind farm. This point is preferably sufficiently far away that there is some probability of it being located in the rest of the network 9 rather than in the island network, when the network fault occurs. In this variant, the frequency and voltage can therefore be kept synchronized to those in the network 9 even if an island network is formed for a relatively long time.

The invention claimed is:

1. A network disturbance module for a control device of a wind energy installation having a generator driven by a wind rotor and a converter for producing electrical power, which is fed into a network, the network disturbance module comprising:
    a measurement device configured to measure at least one electrical parameter of the network;
    a detector configured to identify a network disturbance and output a switching signal;
    a reference generator configured to produce a substitute reference vector for the converter based on the at least one electrical parameter; and
    a fault management unit comprising a fault classifier and configured to interact with the measurement device, detector, and reference generator such that, in the event of an undervoltage during island operation, a quick-action frequency regulator is activated, which acts on the converter to vary a real-power feed P in the event of a discrepancy in a network frequency.

2. The network disturbance module of claim 1, wherein the fault management unit is configured to interact with a voltage regulator in such a way as to regulate network voltage in the event of a change in a reactive power Q during island operation.

3. The network disturbance module of claim 1, wherein the fault management unit is configured to apply the substitute reference vector to the converter in the event of a short circuit.

4. The network disturbance module of claim 1, wherein the fault management unit comprises a time module and the fault classifier is configured to interact with the time module such that, in the event of a persistent short circuit, no more power is fed into the network after a first time period, in the event of a persistent under voltage, no more power is newly fed into the network after a second time period and, during island operation, no more power is fed into the network after a third time period.

5. The network disturbance module of claim 1, wherein the fault management unit has an input channel (CMD), via which at least one of a frequency and a phase angle are predetermined during island operation, and an output channel (OUT) via which the reference vector is output during island operation.

6. The network disturbance module of claim 1, wherein the quick-action frequency regulator is configured to act on a load comprising one of a controllable resistance and a chopper.

7. The network disturbance module of claim 1, wherein the fault management unit comprises a transit module having a ramp function and configured to, at an end of island operation, return the signal applied to the converter for the real power to a preset value, the preset value being the original value before the occurrence of the network fault or a currently demanded value.

8. The network disturbance module of claim 1, further comprising a network following unit configured to limit a difference angle.

9. The network disturbance module of claim 1, further comprising a synchronization module connected to the fault management unit and to the frequency regulator and configured to interact in such a way as to match the substitute reference vector to an external point.

10. The network disturbance module of claim 9, wherein the synchronization module comprises a communication unit and is configured to interact with a time reference to provide the substitute reference vector with a time stamp.

11. A wind farm comprising a farm master and a plurality of wind energy installations, each wind energy installation having a generator driven by a wind rotor and a converter for producing electrical power which is fed into a network, wherein the farm master comprises the network disturbance module of claims 1.

12. A method for operating a wind energy installation having a generator driven by a wind rotor and a converter for producing electrical power which is fed into a network, comprising:
measuring of an electrical parameter of the network;
detecting island network formation with the output of a switching signal;
generating a reference value as a reference vector based on the measured parameter for the converter;
classifying a fault on identification of the switching signal; and
in the event of an under voltage during island operation, carrying out quick-action frequency regulation, in which the frequency of the network is regulated by means of the converter by varying a real power P.

13. The method of claim 12, wherein a network disturbance module performs the steps of the method.

14. The method of claim 13, wherein a synchronization module synchronizes the wind energy installation with a farm master or with another wind energy installation.

15. The method of claim 14, wherein farm-external preset values are received and used for synchronization.

* * * * *

UNITED STATES PATENT AND TRADEMARK OFFICE
CERTIFICATE OF CORRECTION

PATENT NO. : 8,378,515 B2  Page 1 of 1
APPLICATION NO. : 12/682438
DATED : February 19, 2013
INVENTOR(S) : Jens Fortmann It is certified that error appears in the above-identified patent and that said Letters Patent is hereby corrected as shown below:

In the Specification:

At column 11, line number 25, delete "voltage q" and replace with --voltage φ--

Signed and Sealed this
Fourteenth Day of May, 2013

Teresa Stanek Rea
*Acting Director of the United States Patent and Trademark Office*